INVENTOR.
BERT H. DANN
BY Christie, Parker & Hale
ATTORNEYS.

INVENTOR.
BERT H. DANN
BY Christie, Parker & Hale
ATTORNEYS.

United States Patent Office 3,443,037

Patented May 6, 1969

3,443,037

MULTITRACK TAPE RECORDER WITH MECHANICAL TRACK-CHANGE SYSTEM

Bert H. Dann, Altadena, Calif., assignor, by mesne assignments, to Bell & Howell Company, Chicago, Ill., a corporation of Illinois Filed Oct. 23, 1965, Ser. No. 504,040
Int. Cl. G11b 5/56, 5/28
U.S. Cl. 179—100.2 8 Claims

ABSTRACT OF THE DISCLOSURE

There is described a multichannel tape recorder in which a single head is advanced from channel to channel by mounting the head on a threaded shaft. Rotation of the shaft through one revolution moves the head through a circle, causing the head to move out of contact and back into contact with the tape while advancing across the tape from one channel to the next.

This invention relates to magnetic tape recorders and, more particularly, is concerned with a multitrack tape recorder with a mechanical track-changing system.

The use of multiple parallel tracks on a single magnetic tape is well known in the magnetic tape recording art. Generally, magnetic heads having multiple gaps for recording in separate channels on tape are used. Multiple track recorders have been developed for recording video signals. The signal is recorded on a single longitudinal track at relatively high speed. The tape is then reversed and recorded in a parallel track in the reverse direction. In this manner, the tape is scanned back and forth and successive tracks laid down on the tape. To record the broad frequency spectrum of video signals, magnetic heads having very small gaps must be used to record on tape which is moved across the gap at a very high speed. Good contact must be made at all times between the magnetic tape and the head to develop a sufficiently high signal level on playback.

The use of multigap transducer heads for video recording therefore presents several problems. The high tape speed means a high rate of wear of the magnetic heads. The initial cost as well as the replacement costs of multigap heads becomes an undesirable factor in producing a satisfactory video tape recorder. Alignment problems and intergap shielding problems in multigap heads also dictates against their use in the development of a low cost video tape recorder.

The use of a single gap magnetic head which can be easily replaced has proved to be the most economical approach to multitrack recording of video signals. However, such an arrangement requires some mechanical means for moving the magnetic head laterally in relation to the magnetic tape for recording and playback on successive parallel tracks on the tape. The present invention is directed to an improved mechanical arrangement for mounting a single gap magnetic head so that it is easily translated in position in relation to the magnetic tape so as to record and playback on successive parallel tracks. This mechanical system is unique in that it provides extremely accurate positioning of the magnetic head at each track while keeping the pole tips centered and maintaining the same pole tip protrusion into the tape and maintaining the same position of the head longitudinally of the tape regardless of the track in which it is recording or playing back. At the same time, the present invention provides a simple means of programming automatically the track selection in relation to the direction of tape movement. The invention is particularly characterized by its relative simplicity and ruggedness of construction as well as being foolproof in operation and relatively inexpensive to construct and maintain.

These and other advantages of the present invention are achieved in brief by an arrangement in which a magnetic head is mounted on and supported by a disk, which in turn is secured to one end of a threaded shaft so that as the disk rotates, it is translated axially by the screw threads. Detent means locks the disk in operative position in which the magnetic head is in contact with the magnetic tape. Rotation of the disk and associated shaft by one turn brings the head back into position in contact with the magnetic tape, but translated laterally of the tape by an amount corresponding to the pitch of the thread so that the head now has shifted tracks on the magnetic tape. By rotating the magnetic head in and out of contact with the magnetic tape during the track changing operation, the magnetic head can be cleaned and demagnetized during each track changing operation.

For a more complete understanding of the invention, reference should be made to the accompanying drawings wherein.

Figure 1:
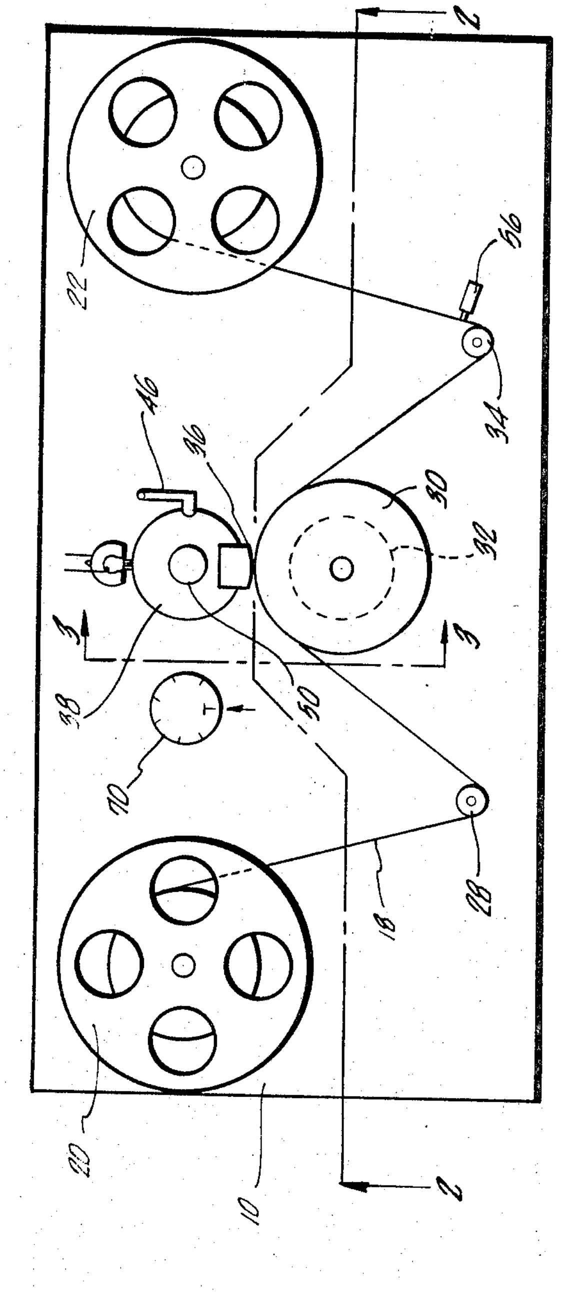
FIGURE 1 is a plan view of a preferred embodiment of the present invention.
Figure 2:
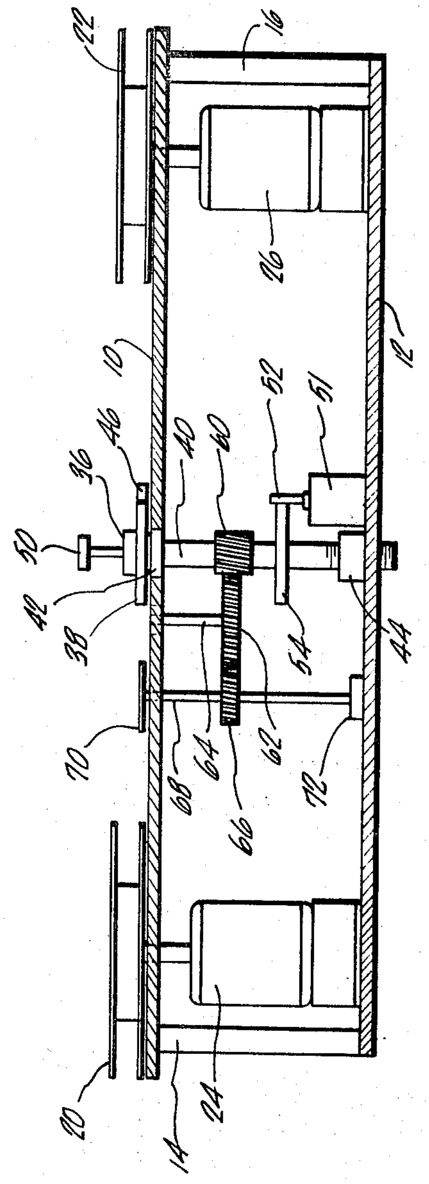
FIGURE 2 is a side view of the tape deck shown in FIGURE 1.
Figure 3:
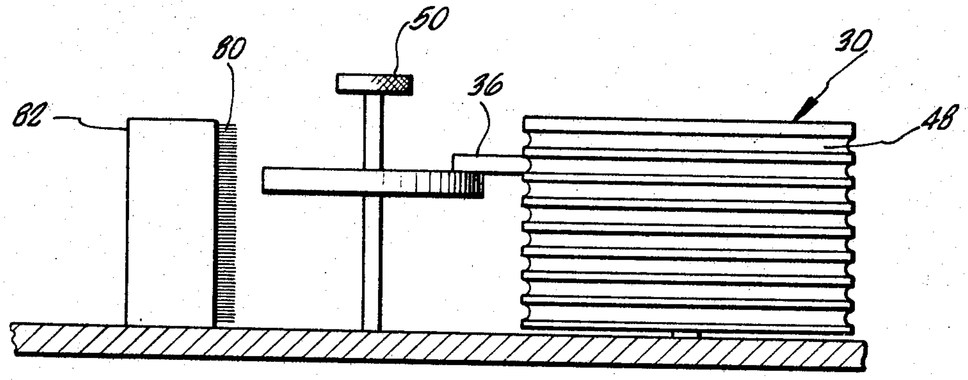
FIGURE 3 is a partial sectional view taken substantially on the line 3—3 of FIGURE 1.

Referring to FIGURES 1–3 in detail, the numeral 10 indicates generally the deck forming the main frame assembly of the recorder unit. Positioned below the deck 10 is a parallel frame member 12 supported in spaced relationship to the deck 10 by frame support members 14 and 16. Magnetic tape, indicated generally at 18, passes between a pair of tape storage reels 20 and 22 which are rotatably driven respectively by reel motors 24 and 26 mounted below the deck 10.

In the preferred embodiment shown in the drawings, the magnetic tape passes from the reel 20 around a guide post 28 and around the periphery of a rotating drum 30 which is driven at constant angular velocity in either direction by a drive motor 32 positioned below the deck 10. The tape then passes around a second guide post 34 and on to the reel 22.

A single gap magnetic head is mounted on a disk 38. The disk in turn is supported on the end of a shaft 40 which passes through and is journalled in a bearing 42 mounted in the deck 10. The lower end of the shaft 40 is threaded and engages a threaded support member 44 secured to the lower frame plate 12. The shaft 40 is free to rotate about an axis parallel to the axis of rotation of the drum 30 so as to rotate the disk 38 and magnetic head 36 relative to the magnetic tape 18 as it passes over the drum 30. A spring detent member 46 mounted above the deck 10 normally engages a notch in the disk 38 to hold the magnetic head 36 in position to engage the magnetic tape 18.

In the preferred form of the invention, as illustrated, the drum 30 is provided with a plurality of circumferential grooves 48. The magnetic head 36 in the detent position protrudes in to one of the grooves 48. Thus the pole tips of the head distend the magnetic tape slightly into the groove ensuring compliant contact between the magnetic tape and the pole tips of the magnetic head. Alternatively, rather than grooves, the drum 48 might be provided with a compliant material on the outer surface against which the magnetic head could press the tape to ensure good contact between the magnetic tape and the pole tips.

A knurled knob 50 projects above the disk 38, permitting manual rotation of the disk and associated head. The pitch of the threaded portion of the shaft 40 is such that one rotation of the disk by the knob 50 advances the magnetic head 36 transversely from one groove to the next groove on the drum.

As shown in FIGURE 2, the shaft 40 is also geared to the output of a motor and clutch assembly 51 having an output pinion 52 engaging a gear 54 on the lower end of the shaft 40. When the motor and clutch assembly is energized, the clutch engages and the shaft 40 is rotated by the motor through a complete revolution. The motor and clutch assembly 51 is controlled in response to end-of-tape sensor 56 in a manner which will hereinafter be more fully explained in connection with the schematic control circuit diagram of FIGURE 4.

The shaft 40 is also coupled through suitable gearing including a pinion 60 on the shaft 40, an idler gear 62 rotatably supported by a shaft 64 from the deck 10, and gear 66 mounted on a shaft 68. The shaft 68 passes through and is journalled in the deck 10. The upper end of the shaft 68 is provided with an indicator dial 70. The lower end of the shaft 68 is connected to a switch 72. As shown in FIGURE 1, the indicator dial 70 has a plurality of numbered positions which correspond to the different tracks on the magnetic tape. The dial 70 also has a position T. The gearing between the shaft 42 and the shaft 68 is such that when the indicator 70 is in position T, the magnetic head 36 is rotated 180° from the position shown in the figure, i.e., diametrically opposite its tape engaging position. This is the initial standby condition in which the magnetic tape may be easily threaded in position in loading the machine. Once the tape is loaded in position, the disk 38 is manually turned by the knob 50 to rotate the magnetic head 36 into contact with the magnetic tape in the first groove. This advances the dial 70 to position 1. The machine is now ready for operation.

Figure 4:
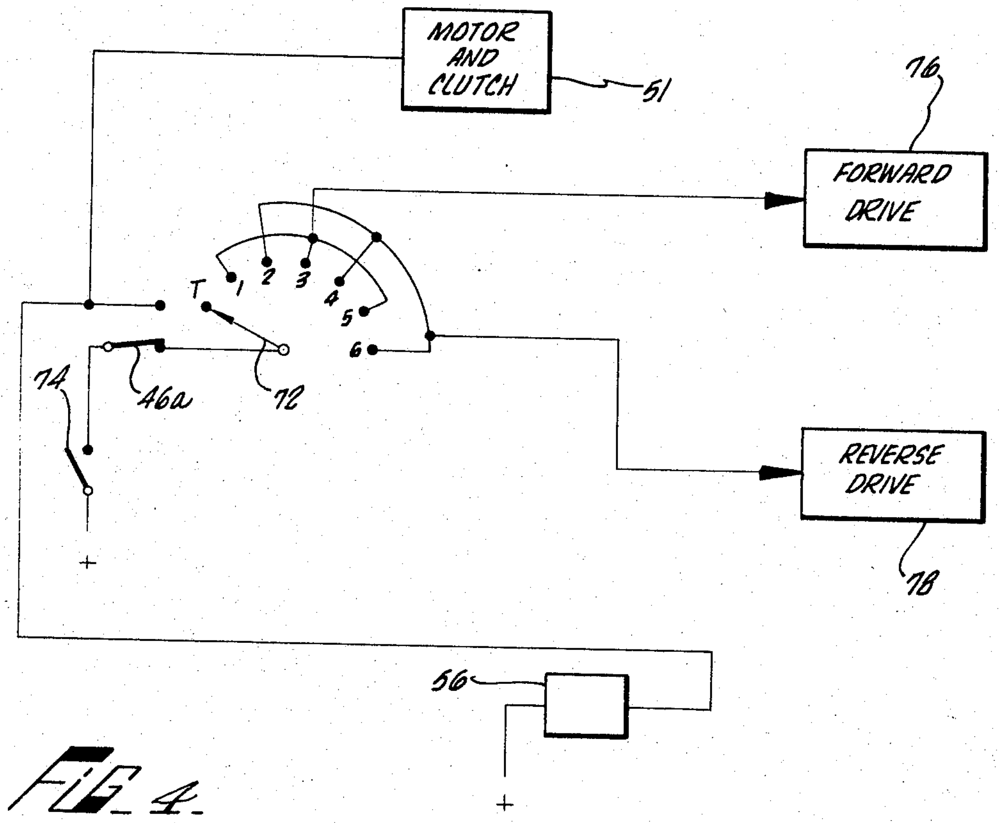
FIGURE 4 is a schematic diagram of the control circuitry for the tape transport.

The operation of the machine can best be understood by reference to the control circuit diagram of FIGURE 4. The functional switch 72 controlled by the shaft 68 contacts a corresponding number of output terminals designated T and 1 through 6, corresponding to the positions indicated by the dial 70. After the tape is loaded, and the magnetic head manually positioned in contact in the first groove, the switch 72 is in position 1. At this time, a start switch 74 is closed completing a circuit to one terminal of a power source (not shown). A series switch **46*a* operated by the detent 46 completes a circuit to the function switch 72. When the detent 46 is locked, the disk 38 is in operative position. The switch 72 in position 1 completes a circuit to the forward drive, indicated generally at 76. The forward drive controls the reel motors 24 and 26 and the drum drive motor 32 to effect a forward drive of the magnetic tape 18**.

When the end of the tape is sensed at the end-of-tape sensor 56, it completes a circuit from a power source to the motor and clutch assembly 51. The end-of-tape sensor may be a device for sensing a change in transparency of the tape, such as a photoelectric device or it may be a device for sensing a change in the conductive properties of the tape, or other well-known means for sensing a condition of the tape which signals that the tape has reached the limit of its length. When the motor and clutch assembly 51 is energized, it rotates the shaft 40 and rotates the disk 38 through one revolution. Rotation of the disk 38 actuates the detent 46 and the associated switch **46*a*. This breaks the circuit to the forward drive 76 and completes a holding circuit to the motor and clutch assembly 51** during the track switching operation.

When the disk 38 has completed one revolution, moving the magnetic head from the first groove to the second groove, the switch 72 and the indicator dial 70 have been moved to position number 2. The function switch 72 now completes a circuit to the reverse drive, indicated generally at 78. Once the detent 46 engages, the switch **46*a* completes the circuit from the power source to the reverse drive 78, causing the tape 18 to be driven in the opposite direction. Thus each time the tape reaches the end of its travel, the end-of-tape sensor 56 rotates the disk 38 through one revolution, advancing the magnetic head to the next track and at the same time changes the function switch 72** so as to effect drive in the opposite direction.

One of the features of the track changing mechanism is that as the magnetic head is rotated from one track position to the next, it is moved out of contact with the magnetic tape. During the track changing interval, the magnetic head can be cleaned and demagnetized. To this end, a brush element 80 may be provided across which the pole tips pass during rotation of the disk 38. The brush 80 may be part of an electromagnet assembly 82 energized from an alternating current source. Thus as the head rotates past the brush 82, it passes through an alternating magnetic field which acts to demagnetize the head.

What is claimed is:

1. A tape recorder comprising a rotating cylindrical drum having a plurality of grooves on the drum surface, means for guiding magnetic tape into contact with the drum surface, a magnetic transducer head, means for supporting the head, said supporting means and associated head being rotatable about an axis substantially parallel with the axis of the rotating drum, means for rotating the supporting means about said axis, the supporting means having an angular position in which the head engages the tape and presses the tape into one of said grooves, and means including a screw thread parallel to the axis of rotation of the supporting means for advancing the supporting means along said axis as the supporting means rotates, the pitch of the thread being equal to the center distance between the grooves in said drum.

2. A tape recorder for recording or playing back a plurality of separate tracks on magnetic tape comprising a rotating cylindrical drum, means for guiding magnetic tape into contact with the drum surface, a magnetic transducer head, means for supporting the head, said supporting means and associated head being rotatable about an axis substantially parallel with the axis of the rotating drum, means for rotating the supporting means about said axis, the supporting means having an angular position in which the head engages the tape, and means including a screw thread parallel to the axis of rotation of the supporting means for advancing the supporting means along said axis as the supporting means rotates, the pitch of the thread being equal to the center distance between the tracks on the tape.

3. A tape recorder for recording on separate tracks on magnetic tape comprising means for driving and guiding the magnetic tape, a magnetic transducer head, means for supporting the head, said supporting means and associated head being rotatable about an axis such that the head moves into and out of contact with the tape with rotation of the supporting means about said axis, means for rotating the supporting means about said axis, the supporting means having an angular position in which the head engages the tape, and means including a screw thread parallel to the axis of rotation of the supporting means for advancing the supporting means along said axis as the supporting means rotates, the pitch of the thread being equal to the center distance between the tracks on the tape.

4. A tape recorder for recording on separate tracks on magnetic tape comprising means for driving and guiding the magnetic tape in either direction, a magnetic transducer head, means for supporting the head, said supporting means and associated head being rotatable about an axis, means for rotating the supporting means about said axis, the supporting means having an angular position in which the head engages the tape and an angular position in which the head is disengaged with the tape, and means for advancing the supporting means along said axis as the supporting means rotates the head successively into and out of engagement with the tape by an amount that the head moves into engagement with another track on the tape with each complete revolution of the supporting means about said axis.

5. In a tape transport in which tape is driven in either direction through the operational zone, the combination comprising a transducer head in the operational zone engaging the tape for recording along a track, rotatable means supporting the head for movement of the head in a circular path tangential to the tape and into and out of engagement with the tape with each revolution of the supporting means, and means for translating the head transversely of the tape with each revolution of the supporting means to bring the head successively into engagement with each one of the parallel tracks on the tape.

6. Apparatus as defined in claim 5 further including means for driving the supporting means, means for reversing the direction of tape drive, and means for simultaneously actuating the reversing means and the drive means for the head supporting means, whereby the head is moved into engagement with a different track when the tape is reversed.

7. Apparatus as defined in claim 5 further including means for generating an alternating magnetic field, said means being positioned away from the tape and along the path of the head as it is moved by the supporting means such that the head passes through the magnetic field as moved from one track engaging position to another.

8. Apparatus as defined in claim 7 further including means for locking the head and supporting means in engaging position with the tape, and means for releasing the lock means when the supporting means is rotated.

References Cited

UNITED STATES PATENTS 2,513,423 7/1950 Owens ----------- 179—100.2

BERNARD KONICK, *Primary Examiner.*

R. S. TUPPER, *Assistant Examiner.*

U.S. Cl. X.R.

274—4